(12) United States Patent
Lee

(10) Patent No.: US 7,808,680 B2
(45) Date of Patent: Oct. 5, 2010

(54) IMAGE FORMING APPARATUS AND CONTROL METHOD THEREOF

(75) Inventor: Jae Sung Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 52 days.

(21) Appl. No.: 12/206,985

(22) Filed: Sep. 9, 2008

(65) Prior Publication Data
US 2009/0147320 A1  Jun. 11, 2009

(30) Foreign Application Priority Data
Dec. 6, 2007   (KR) ...................... 10-2007-0125978

(51) Int. Cl.
  *H04N 1/40*  (2006.01)
  *H04N 1/04*  (2006.01)
(52) U.S. Cl. ........................ 358/461; 358/496; 358/486; 358/406
(58) Field of Classification Search ................. 358/461, 358/486, 496, 406, 604; 382/274
See application file for complete search history.

(56) References Cited

U.S. PATENT DOCUMENTS

| 5,101,284 | A  | * | 3/1992  | Tanabe ........................ 358/461 |
| 6,567,188 | B1 | * | 5/2003  | Thompson et al. .......... 358/461 |
| 7,433,097 | B2 | * | 10/2008 | Spears ......................... 358/504 |
| 7,545,544 | B2 | * | 6/2009  | Tanaka et al. ................ 358/496 |
| 7,633,653 | B2 | * | 12/2009 | Nishizawa et al. .......... 358/461 |

FOREIGN PATENT DOCUMENTS

JP   2002-232652   8/2002

* cited by examiner

*Primary Examiner*—Cheukfan Lee
(74) *Attorney, Agent, or Firm*—Staas & Halsey LLP

(57) ABSTRACT

An image forming apparatus including: a reflection member to reflect light at a first position spaced a predetermined distance from a scan glass; a moving unit to move the reflection member between the first position and a second position; and a control unit to generate initial reference data from an image signal transmitted from a scanning device to receive the light reflected by the reflection member. When the initial reference data is not suitable for shading correction, the control unit controls the moving unit to move the reflection member to the second position for reference data reacquisition.

27 Claims, 7 Drawing Sheets

IMAGE FORMING APPARATUS AND CONTROL METHOD THEREOF

CROSS-REFERENCE TO RELATED APPLICATION

This application claims the benefit of Korean Patent Application No. 2007-125978, filed Dec. 6, 2007, in the Korean Intellectual Property Office, the disclosure of which is incorporated herein by reference.

BACKGROUND OF THE INVENTION

1. Field of the Invention

Aspects of the present invention relate to an image forming apparatus that performs shading correction to prevent quality deterioration of image data and a control method thereof.

2. Description of the Related Art

Generally, an image forming apparatus (such as a digital multifunction machine, a copying machine, a scanner, and a facsimile) includes a scanning device to scan image data of a document. The scanning device emits light from a light source to the document and photoelectrically converts the light reflected from the document through an image sensor to generate an image signal.

During the generation of the image signal of the document, the image signal may be distorted due to a deviation of the light source or a non-uniformity of light quantity. The distortion of the image signal is known as a shading phenomenon.

A general image forming apparatus performs shading correction to compensate for the distortion of the image signal. The shading correction includes an image processing operation that compares image data of a document with reference data to decide a white pixel value or a black pixel value, and corrects an abnormal pixel with values of surrounding pixels. The reference data is image data read from a white reference plane before the image of the document is acquired.

According to the conventional art, the shading correction is performed on the abnormal pixel irrespective of whether the abnormal pixel is generated due to contamination of the white reference plane or contamination of a scan glass or an optical path.

The abnormal pixel generated due to the contamination of the scan glass or the optical path is repetitively generated whenever the document is scanned. For this reason, shading correction is performed to prevent quality deterioration.

However, when reference data is acquired from a white reference plane of a white bar disposed above the scan glass, the quality of the image data of the document may not be deteriorated, because the scanning process is carried out while the document is located between the white bar and the scan glass. Consequently, when the shading correction is performed within the range in which the abnormal pixel is generated, the quality of the image data of the document deteriorates.

SUMMARY OF THE INVENTION

Aspects of the present invention provide an image forming apparatus and a method of controlling the same that prevent unnecessary shading correction of an abnormal pixel generated due to the contamination of a white bar.

According to an aspect of the present invention, there is provided an image forming apparatus having a scan glass and a scanning device to generate image data of a document placed on the scan glass, the image forming apparatus including: a reflection member to reflect light to the scanning device when the reflection member is at a first position spaced a first predetermined distance from the scan glass; a moving unit to move the reflection member between the first position and a second position spaced a second predetermined distance from the scan glass; and a control unit to determine whether first image data generated from the light reflected off of the reflection member and received by the scanning device when the reflection member is in the first position is suitable for image correction, and to control the moving unit to move the reflection member to the second position to generate second image data when the first image data is not suitable for the image correction.

The moving unit may include a solenoid coupled to the reflection member to move the reflection member between the first and second positions when the solenoid is energized.

The control unit may determine whether the image data of the document is to be corrected according to a difference between a level of one or more abnormal pixels included in the first image data and a level of the one or more abnormal pixels included in the second image data.

The control unit may not correct the image data of the document when it is determined that the first image data is not suitable due to contamination of the reflection member.

The reflection member may have a white-colored surface facing a first side of the scan glass, while the scanning device may be located at a second side of the scan glass, opposite the first side.

According to another aspect of the present invention, there is provided a control method of an image forming apparatus having a scan glass and a scanning device to generate image data of a document placed on the scan glass, the control method including: reflecting light from a reflection member of the image forming apparatus to the scanning device when the reflection member is at a first position spaced a first predetermined distance from the scan glass; generating first image data from the light reflected from the reflection member and received by the scanning device when the reflection member is in the first position: determining whether the first image data is suitable for image correction on the image data of the document; and moving the reflection member from the first position to a second position to generate second image data when the first image data is not suitable for the image correction.

The determining of whether the first image data is suitable includes determining whether the first image data is suitable based on an abnormal pixel included in the waveform of an image signal corresponding to the data.

The control method may further include determining a difference between a level of an abnormal pixel included in the first image data and a level of the abnormal pixel included in the second image data and determining whether the data is to be corrected according to the difference.

The image data of the document may not be corrected when the difference between the levels is greater than a predetermined value.

The abnormal pixel may be determined to result from contamination of the reflection member when the difference between the levels is greater than the predetermined value.

The image data of the document may be corrected when the difference between the levels is less than a predetermined value.

The abnormal pixels may be determined to have been generated due to contamination of the scan glass or an optical path of the scanning device when the difference between the levels is less than the predetermined value.

According to yet another aspect of the present invention, there is provided a control method of an image forming apparatus having a scan glass, a reflection member, and a scanning device to generate image data of a document placed on the scan glass between the scan glass and the reflection member, the control method including: determining whether first reference data generated from light reflected off of the reflection member and received by the scanning device when the reflection member is in a first position is suitable for image correction; if the first reference data is not suitable for the image correction, determining whether the first reference data is not suitable for the image correction because of the reflection member; and determining that the image data of the document is not to be corrected if the first reference data is determined to not be suitable for the image correction because of the reflection member.

According to still another aspect of the present invention, there is provided an image forming apparatus having a scan glass and a scanning device to generate image data of a document placed on the scan glass, the image forming apparatus including: a reflection member to reflect light to the scanning device when the reflection member is spaced a first predetermined distance from the scan glass; and a control unit to determine whether first image data generated from the light reflected off of the reflection member and received by the scanning device when the reflection member is spaced the first predetermined distance from the scan glass is suitable for image correction, and to control the reflection member, the scanning device, and/or the scan glass such that the reflection member is spaced a second predetermined distance from the scan glass, different from the first predetermined distance, to generate second image data when the first image data is not suitable for the image correction.

According to another aspect of the present invention, there is provided an image forming apparatus having a scan glass and a scanning device to generate image data of a document placed on the scan glass, the image forming apparatus including: a reflection member to reflect light to the scanning device when the reflection member is spaced a first predetermined distance from the scan glass, and to reflect light to the scanning device when the reflection member is spaced a second predetermined distance from the scan glass, different from the first predetermined distance; and a control unit to generate first image data from the light reflected off of the reflection member when the reflection member is spaced the first predetermined distance from the scan glass, to generate second image data from the light reflected off of the reflection member when the reflection member is spaced the second predetermined distance from the scan glass, and to compare the first image data to the second image data in order to determine if the image data of the document is to be corrected.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
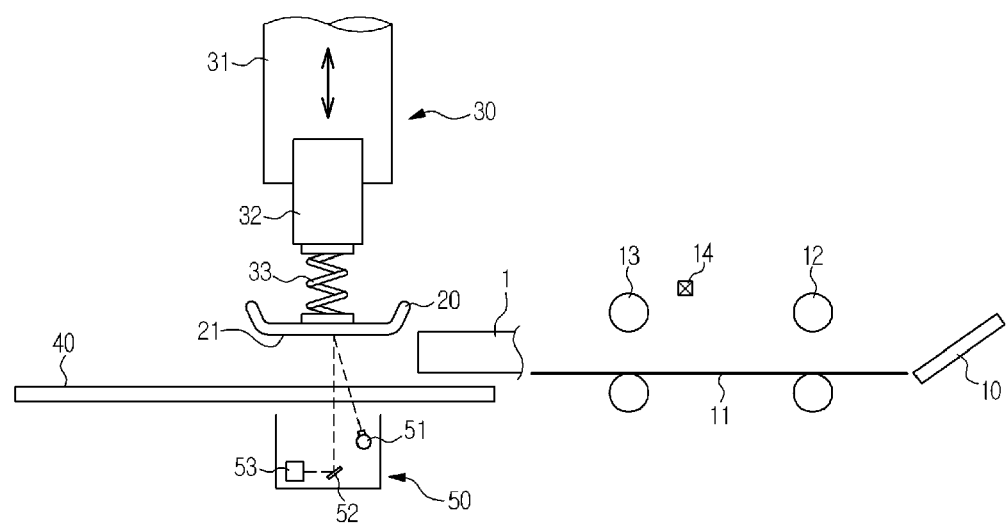
FIG. 1 is a view schematically illustrating a structure of an image forming apparatus according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a view schematically illustrating a structure of an image forming apparatus according to an embodiment of the present invention. The image forming apparatus includes a scanning device to acquire the image of a document. According to how the document is fed for scanning, the scanning device may generally be classified as a flat bed type scanning device or a sheet feed type scanning device.

Referring to FIG. 1, the image forming apparatus includes a sheet feed type automatic document feeder (ADF) to automatically move a document to a scanning position.

Specifically, a document 1 to be scanned is placed on a document loading plate 10. The document 1, placed on the document loading plate 10, is supplied to a document feed path 11 by a paper supply unit (not shown). Feed motors 12 and 13 to drive a plurality of feed rollers and a document detection sensor 14 to detect the document being fed are mounted on or in proximity to the document feed path.

Furthermore, a scan glass 40 is mounted at one end of the document feed path 11. A white bar 20 is disposed above the scan glass 40 as a reflection member, and a scanning device 50 is disposed below the scan glass 40.

The scanning device 50 includes a light source 51 to emit light, a light guide member 52 to reflect the emitted light, and an image sensor 53 to receive the reflected light and output the waveform of an image signal. It is understood that according to other embodiments, the light guide member 52 may be omitted, or more than one light guide member 52 may be included to guide the light to the image sensor 53. The scanning device 50 may further include a condensing lens (not shown) to condense light. A contact image sensor may be used as an image sensor. However, it is understood that aspects of the present invention are not limited thereto. For example, a charge coupled device (CCD) may alternatively be used.

The white bar 20 guides the document 1 being fed along the document feed path 11. The white bar 20 has a bottom 21 that is a white reference face used for shading correction. Furthermore, the white bar 20 is coupled to a moving unit 30.

The moving unit 30 includes a case 31 having an inner space into and out of which a solenoid 32 moves, and an elastic member 33 connected between the solenoid 32 and the white bar 20 to elastically support the document depending upon the thickness of the document. The solenoid 32 rises, when the solenoid 32 is energized, and lowers when the energizing of the solenoid 32 is interrupted under the control of a control unit, which will be described below.

Figure 2:
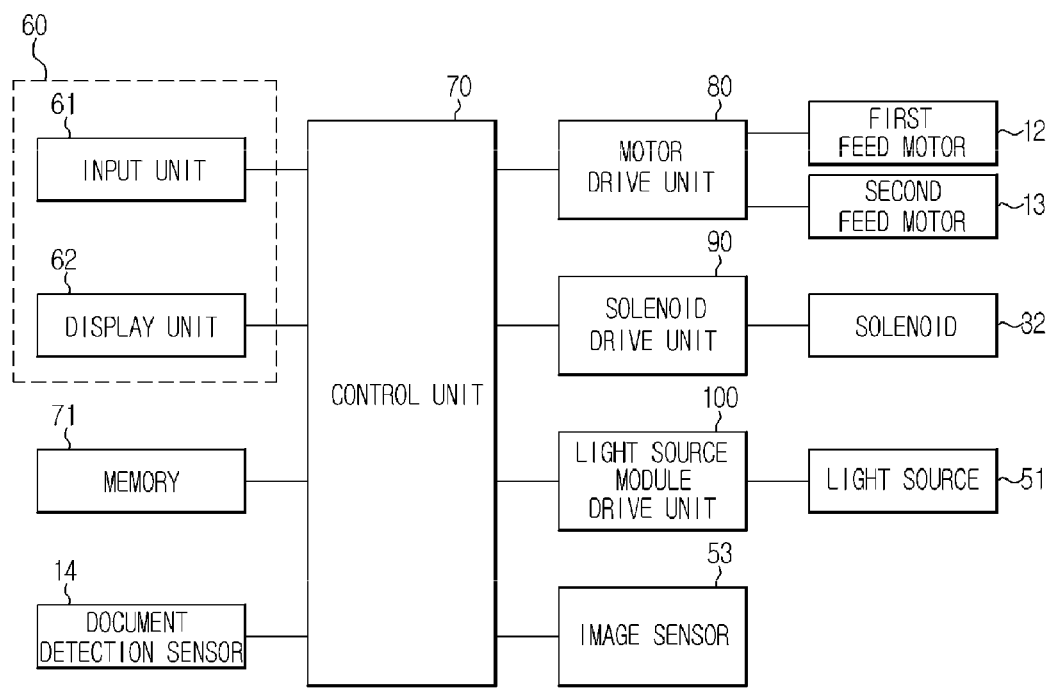
FIG. 2 is a block diagram of an image forming apparatus according to an embodiment of the present invention.

FIG. 2 is a block diagram of an image forming apparatus according to an embodiment of the present invention. Referring to FIG. 2, the image forming apparatus includes feed motors 12 and 13, a document detection sensor 14, a solenoid 32, a light source 51, an image sensor 53, a manipulation panel 60, a control unit 70, a memory 71, a motor drive unit 80, a solenoid drive unit 90, and a light source module drive unit 100. The manipulation panel 60 may be mounted at an outside surface of the apparatus such that a user can conveniently manipulate the manipulation panel 60. The manipulation panel 60 includes an input unit 61 to allow a user to input a command and a display unit 62 to display information of the inputted command and information of an operating state of the image forming apparatus. The input unit 61 and the display unit 62 may be integrated into one unit, such as a touch screen on which an input is received according to a touch of the user.

When the document 1 is placed on the document loading plate 10, the control unit 70 controls the motor drive unit 80 to drive the first feed motor 12 and/or the second feed motor 13 such that the document 1 is fed by the first feed motor 12 and/or the second feed motor 13. The document detection sensor 14 detects the document 1 being fed and provides the detection result to the control unit 70.

When the document 1 is located between the white bar 20 and the scan glass 40, the control unit 70 controls the light source module drive unit 100 to emit light from the light source 51 to the document 1. The light emitted from the light source 51 is reflected by the document 1 and inputted to the scanning device 50. The reflected light, inputted to the scanning device 50, is guided to the image sensor 53 by the light guide member 52. As described above, it is understood that according to other aspects, the light guide member 52 may be omitted, or more than one light guide member 52 may be included.

The image sensor 53 provides the waveform of an image signal to the control unit 70. The control unit 70 digitizes the waveform of the image signal inputted thereto, and performs image correction (such as shading correction and background treatment). The memory 71 stores reference data used for the image correction. When the image correction is completed, the control unit 70 may transmit the scanned image data to a host computer via an interface unit (not shown), perform a printing operation using a printer engine module (not shown), and/or transmit the scanned image data via a network using a communication connection module.

Hereinafter, an operation of acquiring the reference data will be described. Before the document 1 is fed, the control unit 70 controls the light source 51 to emit light to the bottom 21 of the white bar 20 through the light source module drive unit 100. The light, reflected by the bottom 21, is inputted to the scanning device 50 via the scan glass 40. The image sensor 53 receives the light reflected from the bottom 21 and provides the waveform of an image signal to the control unit 70.

The control unit 70 digitizes the waveform of the image signal and determines whether the digitized waveform is recognized as reference data. When the digitized waveform is recognized as the reference data, the digitized waveform is stored in the memory 71. Whether the digitized waveform is recognized as the reference data is determined according to whether an abnormal pixel exists. When no abnormal pixel exists, the digitized waveform is directly recognized as the reference data.

Figure 4A:
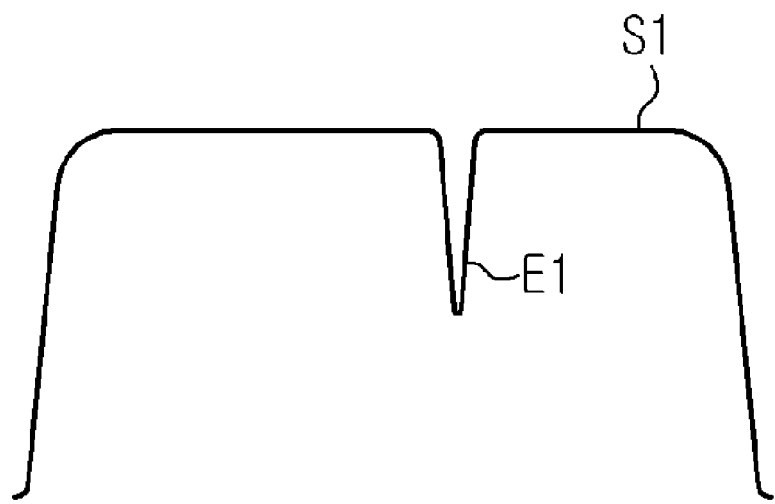
FIG. 4A is a waveform of a signal corresponding to reference data initially acquired according to an embodiment of the present invention.

When an abnormal pixel E1 exists in a signal waveform S1 corresponding to the initially acquired reference data, as shown in FIG. 4A, the white bar 20 is moved to reacquire the reference data. Then, the reacquired digitized waveform is recognized as the reference data according to a change in a level of the abnormal pixels.

Figure 3:
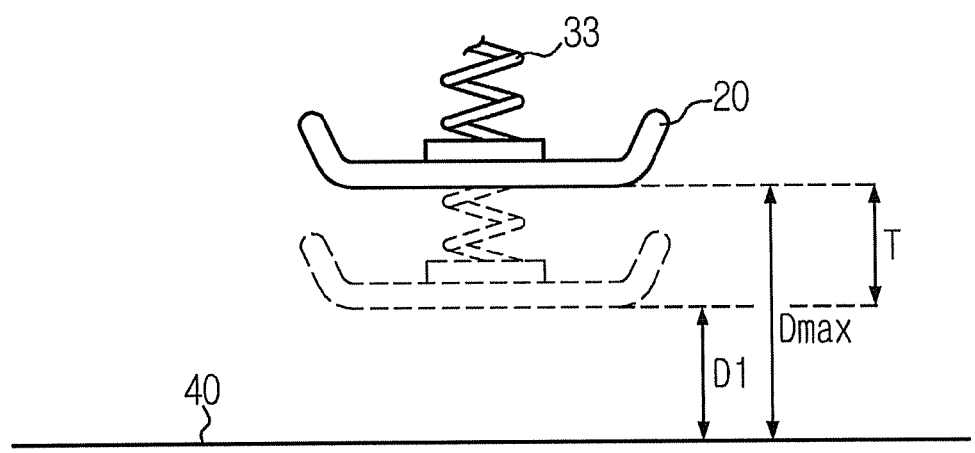
FIG. 3 is a view illustrating a movement of a white bar according to an embodiment of the present invention.

FIG. 3 is a view illustrating a movement of a white bar according to an embodiment of the present invention. Referring to FIG. 3, when the reference data is initially acquired, the white bar 20 is located at a position spaced a reference distance D1 from the scan glass 40. When the reference data is reacquired, the control unit 70 energizes the solenoid 32 through a solenoid drive unit 90 to raise the white bar 20. At this time, the white bar 20 is moved within an effective range T between the reference distance D1 and the maximum distance Dmax. Preferably, the white bar 20 is located at a position spaced the maximum distance Dmax from the scan glass 40. Here, the maximum distance may be the distance to the farthest position from which the scanning device 50 can recognize when the white bar 20 becomes more distant from the scan glass 40.

Figure 4B:
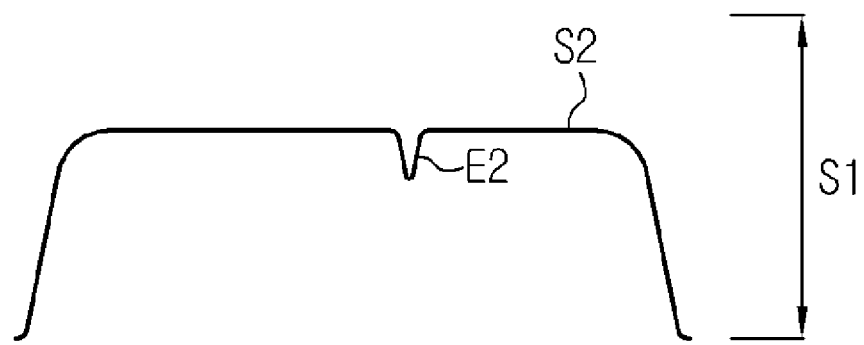
FIG. 4B is a waveform of a signal corresponding to reference data reacquired according to an embodiment of the present invention when a bottom of the white bar is contaminated.

Referring to FIG. 4B, when an abnormal pixel E2 exists in a signal waveform S2 corresponding to the reacquired reference data, the control unit 70 compares the level of this abnormal pixel E2 with the level of the initial abnormal pixel E1 (illustrated in FIG. 4A). When the change in level of the abnormal pixels is large, the control unit 70 recognizes that the recognition ability of the scanning device 50 has been affected by the movement of the white bar 20. Specifically, when the bottom 21 of the white bar 20 is contaminated due to scratches, the level of the abnormal pixel E2 of the signal waveform S2 corresponding to the reference data reacquired from the light reflected by the bottom 21 and inputted to the scanning device 50 as the white bar 20 becomes more distant from the scan glass 40 decreases in proportion to the distance in which the white bar is moved. At this time, the change in level of the abnormal pixels is large.

Figure 4C:
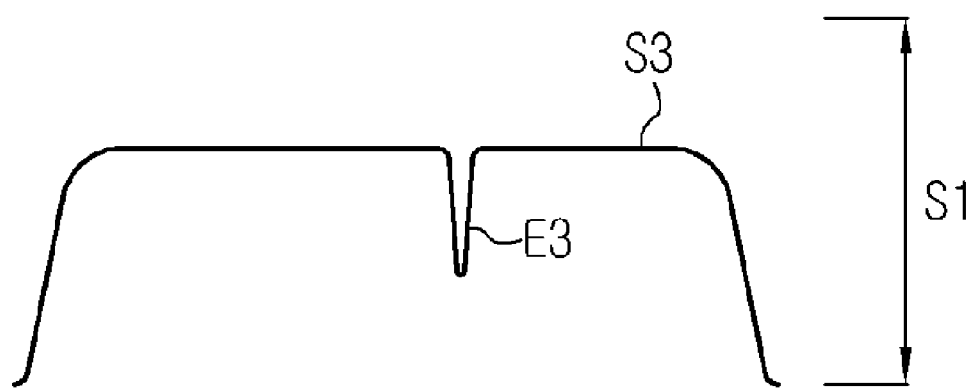
FIG. 4C is a waveform of a signal corresponding to reference data reacquired according to an embodiment of the present invention when a scan glass or an optical path is contaminated.

As shown in FIG. 4C, the level of an abnormal pixel E2 of a signal waveform S2 corresponding to the reference data acquired from the light reflected by the bottom 21 and inputted to the scanning device 50 decreases as the white bar 20 becomes more distant from the scan glass 40. As can be seen, however, the change in level of the abnormal pixels is relatively small. Specifically, when the abnormal pixel is generated due to scratches on the surface of the scan glass 40 or contamination caused by dust on the optical path in the scanning device, to which the reflected light is inputted, the level of the abnormal pixel of the reacquired reference data does not greatly decrease, if at all. In this case, the reference data is corrected. The correction of the reference data is performed using the values of pixels around the abnormal pixel. However, it is understood that aspects of the present invention are not limited thereto. For example, alternatively, the reference data may be corrected with the mean value of the surrounding pixels. Also, the control unit 70 may display a cause of the abnormal pixel through the display unit 62 so that a user can act accordingly.

Figure 5:
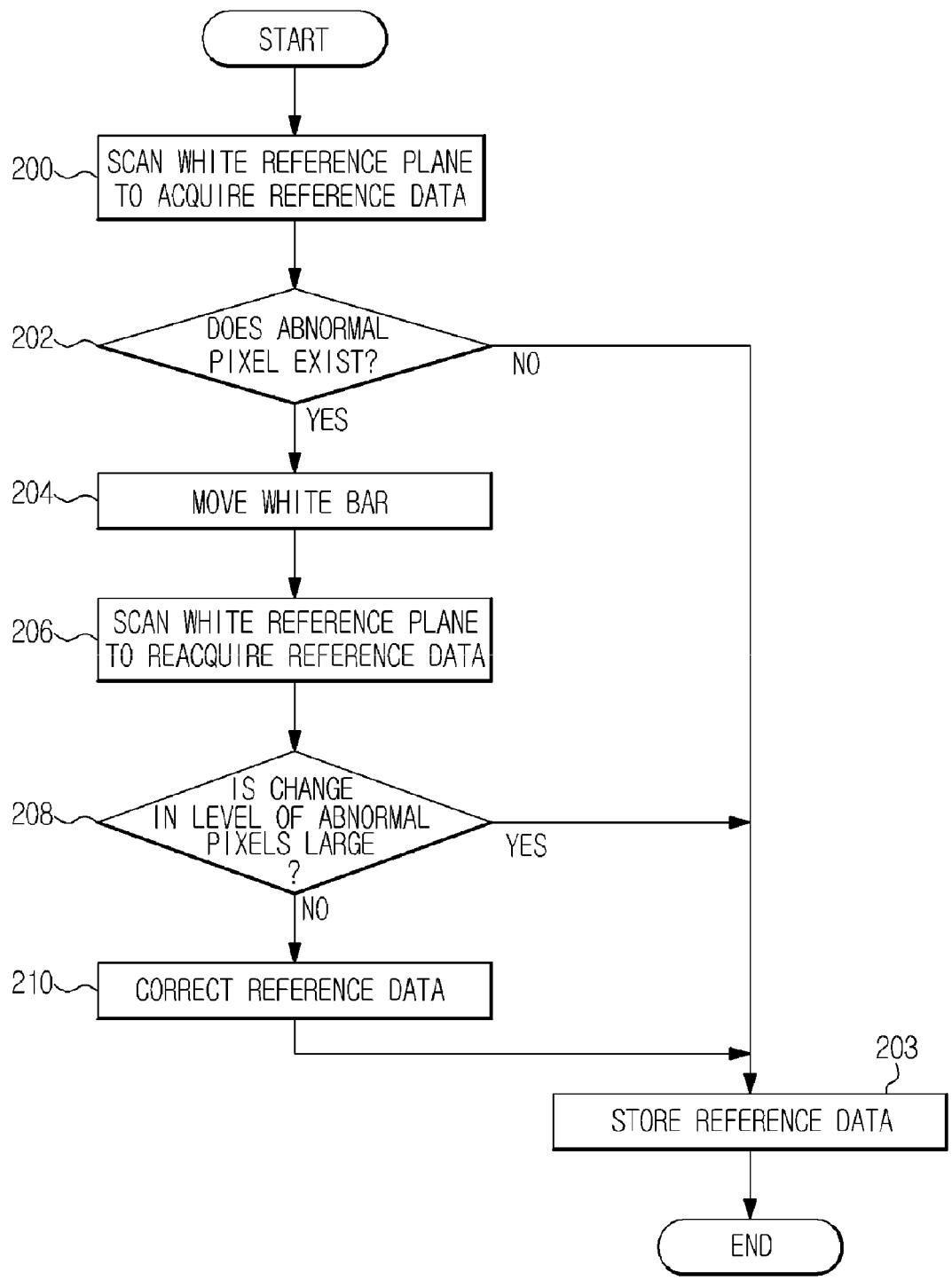
FIG. 5 is a flow chart illustrating a control method of an image forming apparatus according to an embodiment of the present invention.

FIG. 5 is a flow chart illustrating a control method of an image forming apparatus according to an embodiment of the present invention. Referring to FIGS. 2, 3, and 5, to perform shading correction with respect to image data of a document 1, reference data is acquired prior to acquiring the image data of the document.

The control unit 70 controls the light source module drive unit 100 to emit light from the light source 51 to the bottom 21 of the white bar 20, before the document 1 is placed thereon, and initially acquires reference data of an image signal from the image sensor 53 of the scanning device 50, to which light reflected by the bottom 21 is inputted in operation 200.

The control unit 70 determines whether an abnormal pixel exists in a signal waveform corresponding to the initially acquired reference data in operation 202. When it is determined that no abnormal pixel exists in the reference data (operation 202), the initially acquired reference data is recognized as reference data for shading correction and is stored in the memory 71 in operation 203. The reference data stored in the memory 71 is used to perform shading correction on the image data of the document hereafter.

When it is determined that an abnormal pixel exists in the reference data (operation 202) (i.e., an abnormal pixel E1 having a level different from those of the surrounding pixels exists in a signal waveform S1, as shown in FIG. 4A), the initially acquired reference data is not recognized as the reference data for shading correction, and the white bar 20 is moved to reacquire the reference data in operation 204. Specifically, the control unit 70 controls the solenoid drive unit 90 to energize the solenoid 32. As a result, the white bar 20 connected to one side of the solenoid 32 is raised. When the white bar 20 is moved to a position spaced the maximum distance Dmax from the scan glass 40, the energizing of the solenoid 32 is interrupted. It is understood that aspects of the present invention are not limited to reacquiring the reference data from a position that is higher than an initial position. According to other aspects, the reacquired reference data may be acquired from a position closer to the scan glass than the initial position.

Subsequently, the control unit 70 emits light from the light sources 51 to the bottom 21 of the white bar 20 and receives an image signal from the image sensor 53 of the scanning device 50, to which the light reflected by the bottom 21 is inputted, to reacquire the reference data in operation 206.

Subsequently, the control unit 70 compares the level of the abnormal pixel of the signal waveform corresponding to the reference data with the level of the abnormal pixel of the signal waveform corresponding to the initially acquired reference data to determine whether the change in level of the abnormal pixels is large in operation 208. For example, the control unit may determine that the change in level of the abnormal pixels is large if the change is greater than a predetermined reference value.

When it is determined that the change in level of the abnormal pixels is large (operation 208), the bottom 21 of the white bar 20 is determined to be contaminated. When the bottom 21 is contaminated as described above, the contamination has no influence on the shading correction to the image data of the scanned document. Consequently, the acquired reference data is stored in the memory 71 in operation 203. At this time, the initially acquired reference data is stored in the memory 71.

When it is determined that the change in level of the abnormal pixels is not large (operation 208), the control unit 70 determines that the abnormal pixel is generated due to factors other than the white bar 20 (such as scratches on the surface of the scan glass 40 or contamination caused by dust on the optical path in the scanning device to which the reflected light is inputted), and corrects the value of the abnormal pixel with the values of the surrounding pixels in operation 210. Then, the corrected reference data is stored in the memory 71 in operation 203.

After the reference data is stored in the memory as described above, the white bar 20 is lowered such that the white bar 20 is located at a position spaced from the scan glass 40 by the reference distance D1. Subsequently, the document 1, placed on the document loading plate 10, is automatically fed and scanned by the scanning device 50. Then, shading correction is performed on the image data of the scanned document using the reference data stored in the memory 71.

According to aspects of the present invention, the image forming apparatus does not perform shading correction when an abnormal pixel is generated due to contamination of the white bar located on the scan glass, thereby preventing quality degradation of the document image.

Aspects of the present invention can also be embodied as computer-readable codes on a computer-readable recording medium. Also, codes and code segments to accomplish the present invention can be easily construed by programmers skilled in the art to which the present invention pertains. The computer-readable recording medium is any data storage device that can store data which can be thereafter read by a computer system or computer code processing apparatus. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Aspects of the present invention may also be realized as a data signal embodied in a carrier wave and comprising a program readable by a computer and transmittable over the Internet.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An image forming apparatus having a scan glass and a scanning device to generate image data of a document placed on the scan glass, the image forming apparatus comprising:
    a reflection member to reflect light to the scanning device when the reflection member is at a first position spaced a first predetermined distance from the scan glass;
    a moving unit to move the reflection member between the first position and a second position spaced a second predetermined distance from the scan glass; and
    a control unit to determine whether first image data generated from the light reflected off of the reflection member and received by the scanning device when the reflection member is in the first position is suitable for image correction, and to control the moving unit to move the reflection member to the second position to generate second image data when the first image data is not suitable for the image correction.

2. The image forming apparatus as claimed in claim 1, wherein the moving unit comprises a solenoid coupled to the reflection member to move the reflection member between the first and second positions when the solenoid is energized.

3. The image forming apparatus as claimed in claim 1, wherein the control unit determines whether the image data of the document is to be corrected according to a difference between a level of one or more abnormal pixels included in the first image data and a level of the one or more abnormal pixels included in the second image data.

4. The image forming apparatus as claimed in claim 3, wherein the control unit does not correct the image data of the document when it is determined that the first image data is not suitable for the image correction due to contamination of the reflection member.

5. The image forming apparatus as claimed in claim 1, wherein the reflection member has a white-colored surface facing a first side of the scan glass, and the scanning device is located at a second side of the scan glass opposite the first side.

6. The image forming apparatus as claimed in claim 1, wherein the first and second image data are digitized waveforms of an image signal generated from the reflected light.

7. The image forming apparatus as claimed in claim 6, wherein the control unit determines that the first image data is suitable for the image correction when the first image data does not include any abnormal pixels.

8. The image forming apparatus as claimed in claim 7, wherein:
when the first image data includes one or more abnormal pixels, the control unit compares a level of the one or more abnormal pixels in the first image data with a level of the one or more abnormal pixels in the second image data; and
the control unit determines that the first image data is not suitable for the image correction because the reflection member is contaminated when a difference in the levels is greater than a predetermined value.

9. The image forming apparatus as claimed in claim 8, wherein the control unit does not correct the image data of the document in response to the determination that the reflection member is contaminated.

10. The image forming apparatus as claimed in claim 8, wherein the control unit corrects a value of the one or more abnormal pixels in the first image data and/or the second image data when the difference in the levels is less than a predetermined value, so as to use the first image data and/or the second image data for the image correction.

11. The image forming apparatus as claimed in claim 1, wherein the image correction is a shading correction.

12. The image forming apparatus as claimed in claim 1, wherein the second predetermined distance is greater than the first predetermined distance.

13. A control method of an image forming apparatus having a scan glass and a scanning device to generate image data of a document placed on the scan glass, the control method comprising:
reflecting light from a reflection member of the image forming apparatus to the scanning device when the reflection member is at a first position spaced a first predetermined distance from the scan glass;
generating first image data from the light reflected from the reflection member and received by the scanning device when the reflection member is in the first position;
determining whether the first image data is suitable for image correction on the image data of the document; and
moving the reflection member from the first position to a second position spaced a second predetermined distance from the scan glass in order to generate second image data when the first image data is not suitable for the image correction.

14. The control method as claimed in claim 13, wherein the determining of whether the first image data is suitable comprises determining that the first image data is not suitable if a waveform of an image signal corresponding to the first image data indicates that the first image data includes an abnormal pixel.

15. The control method as claimed in claim 14, further comprising:
determining a difference between a level of the abnormal pixel included in the first image data and a level of the abnormal pixel included in the second image data; and
determining whether the image data of the document is to be corrected according to the difference between the levels.

16. The control method as claimed in claim 15, wherein the determining of whether the image data of the document is to be corrected comprises determining that the image data of the document is not to be corrected when the difference between the levels is greater than a predetermined value.

17. The control method as claimed in claim 16, wherein the determining that the image data of the document is not to be corrected comprises determining that the abnormal pixel results from contamination of the reflection member when the difference between the levels is greater than the predetermined value.

18. The control method as claimed in claim 15, wherein the determining whether the image data of the document is to be corrected comprises determining that the image data is to be corrected when the difference between the levels is less than a predetermined value.

19. The control method as claimed in claim 18, wherein the determining that the image data is to be corrected comprises determining that the abnormal pixel results from contamination of the scan glass or an optical path of the scanning device when the difference between the levels is less than the predetermined value.

20. The control method as claimed in claim 13, wherein the image correction is a shading correction.

21. The control method as claimed in claim 13, wherein the second predetermined distance is greater than the first predetermined distance.

22. A computer readable recording medium encoded with the method of claim 13 and implemented by a computer.

23. A control method of an image forming apparatus having a scan glass, a reflection member, and a scanning device to generate image data of a document placed on the scan glass between the scan glass and the reflection member, the control method comprising:
determining whether first reference data generated from light reflected off of the reflection member and received by the scanning device when the reflection member is in a first position is suitable for image correction;
if the first reference data is not suitable for the image correction, determining whether the first reference data is not suitable for the image correction because of the reflection member; and
determining that the image data of the document is not to be corrected if the first reference data is determined to not be suitable for the image correction because of the reflection member.

24. The control method as claimed in claim 23, wherein the determining of whether the first image is not suitable for the image correction because of the reflection member comprises:
comparing a level of one or more abnormal pixels in the first reference data with a level of the one or more abnormal pixels in second reference data generated from light reflected off of the reflection member and received by the scanning device when the reflection member is in a second position, different from the first position; and
determining that the first image is not suitable for the image correction because of the reflection member if a difference in the levels is greater than a predetermined value.

25. The control method as claimed in claim 23, wherein the determining of whether the first reference data is suitable for the image correction comprises determining if the first reference data includes one or more abnormal pixels.

26. An image forming apparatus having a scan glass and a scanning device to generate image data of a document placed on the scan glass, the image forming apparatus comprising:
- a reflection member to reflect light to the scanning device when the reflection member is spaced a first predetermined distance from the scan glass; and
- a control unit to determine whether first image data generated from the light reflected off of the reflection member and received by the scanning device when the reflection member is spaced the first predetermined distance from the scan glass is suitable for image correction, and to control at least one of the reflection member, the scanning device, the scan glass or the combinations thereof such that the reflection member is spaced a second predetermined distance from the scan glass, different from the first predetermined distance, to generate second image data when the first image data is not suitable for the image correction.

27. An image forming apparatus having a scan glass and a scanning device to generate image data of a document placed on the scan glass, the image forming apparatus comprising:
- a reflection member to reflect light to the scanning device when the reflection member is spaced a first predetermined distance from the scan glass, and to reflect light to the scanning device when the reflection member is spaced a second predetermined distance from the scan glass, different from the first predetermined distance; and
- a control unit to generate first image data from the light reflected off of the reflection member when the reflection member is spaced the first predetermined distance from the scan glass, to generate second image data from the light reflected off of the reflection member when the reflection member is spaced the second predetermined distance from the scan glass, and to compare the first image data to the second image data in order to determine if the image data of the document is to be corrected.

* * * * *